United States Patent
Newsteder

[15] 3,682,193
[45] Aug. 8, 1972

[54] SIPHONING APPARATUS

[72] Inventor: Robert Newsteder, 60 South Essex Ave., Orange, N.J. 07051

[22] Filed: Oct. 14, 1970

[21] Appl. No.: 80,677

[52] U.S. Cl.................................................137/151
[51] Int. Cl. ................................................F04f 10/00
[58] Field of Search......137/142, 145, 144, 147, 148, 137/149, 151, 153; 4/46

[56] References Cited

UNITED STATES PATENTS

| 1,042,365 | 10/1912 | Meyer | 4/46 |
| 1,349,683 | 8/1920 | McCloud | 4/46 |
| 3,491,787 | 1/1970 | Braun | 137/142 |

*Primary Examiner*—Henry T. Klinksiek
*Attorney*—Kirschstein, Kirschstein, Ottinger & Frank

[57] ABSTRACT

A siphoning apparatus including a hollow water conducting member having one end which can be placed in an aquarium tank and another end which can be placed in a filter receptacle. Water intake means is located at the end which is placed in the aquarium and a flapper valve is located within said water conducting member. The flapper valve is arranged so that upon being moved away from and towards the water intake means water is drawn through the water intake means into the water conducting member and to the end of the siphoning apparatus which is in the filter receptacle so that siphoning can commence.

5 Claims, 5 Drawing Figures

Patented Aug. 8, 1972

3,682,193

INVENTOR
ROBERT NEWSTEDER
BY
ATTORNEYS

SIPHONING APPARATUS

BACKGROUND OF THE INVENTION

1. Field of the Invention

Siphoning apparatus

2. Description of the Prior Art

Recently, there has been a great upsurge of popularity in home aquariums. Generally, these home aquariums include a water containing tank in which fish are located and some kind of filtering apparatus for filtering and cleaning the water in the tank. There are two distinct kinds of filtering techniques on the market now. One technique involves placing a filtering means having a filter media inside the tank and directing the water in the tank through the filter media so as to clean it. The other type of filtering technique involves placing a filter receptacle having a filter media outside the tank and cycling water from the tank through the filter media and back again to the tank. As the water is so cycled it is cleaned by passing through the filter media. Generally, the outside filter receptacle utilizes a pump which draws water through a siphon from the tank so it can be filtered and then returned to the tank.

Usually siphons are J-shaped tubes with the shorter end of the tube located in the filter receptacle and the longer end of the tube in the tank. In order for the siphon to continuously function it is necessary that it be initially filled with water since if it is initially filled with air, no water can be drawn from the tank to start the filtering. In the past, many people have tried to manually fill the siphon tube with water and place its short end in the filtering receptacle and its long end in the tank. However, this is extremely difficult to successfully do since water is lost from the siphon tube after having been filled and prior to being so positioned. As a result, there is no siphoning action and attempts to fill the siphon had to be repeated numerous times until ultimately enough water was located therein when it was connected to the tank and filtering receptacle so that effective siphoning action could commence.

The prior art recognized the difficulties in attempting to utilize a siphon as just described and placed a hand pump at the neck between the legs of the siphon. Thus, when the short leg of the siphon was connected to the filtering apparatus and the long leg inserted in the tank, a person would squeeze the pump, drawing water into the siphon and filling it. The pump was then removed from the siphon, as the siphon then had sufficient water in it so that effective siphoning could be carried out. The prior art device just described had many drawbacks in that it was unwieldy to use in requiring removing the pump from the siphon. Additionally, the device was expensive to make, took a substantial period of time to become operative and was in other ways undesirable.

SUMMARY OF THE INVENTION

It is therefore an object of the present invention to provide an improved apparatus that can be used for siphoning.

Another object of the present invention is to provide an improved siphoning apparatus that can be used in conjunction with filtering receptacles for home aquariums.

Still another object of the present invention is to provide an improved siphon for use in an aquarium wherein the siphon can be filled with water rapidly so that siphoning operations can commence without undue delay.

A further object of the present invention is to provide an improved siphon for use in an aquarium wherein the length of the siphon can be adjusted as required.

Still another object of the present invention is to provide a siphon that will meet each of the above mentioned and other objects and that is economical to make, reliable in operation and has a long service life.

Briefly, in accordance with the present invention, the foregoing and other objects are achieved by a siphoning apparatus consisting of two parts. The first part is a U-shaped hollow member and is attached to the upper portion of the second part. The second part is hollow and water can flow from the second part to the first part. Located at the bottom portion of the second part are slots and a rod extends through the upper portion of the second part into the said second part. Attached to the rod is a disc which is slidable within the second part and which has an opening extending therethrough. Secured to the rod directly above the disc is a flapper valve for a reason that will be apparent.

In normal use the lower end of the second part of the siphoning apparatus is placed in an aquarium and the free end of the first part is placed in the outside filter receptacle that is used for the aquarium. The rod, disc and flapper are rapidly moved in an up and down direction. When the rod is moved in an upward direction, the flapper rests on the disc and water is elevated by the closed flapper to the upper portion of the second part and into the U-shaped member. When the rod is moved downwardly, the flapper opens allowing water to flow upwardly so the cycle can be repeated. The cycle is continued until the entire apparatus is filled with water at which time the filtering apparatus can then siphon water from the aquarium.

If desired an extension may be added to the lower portion of the second part so that the siphoning apparatus may be used with tanks having different levels of water therein.

These and other objects and advantages of this invention will become apparent to the reader in the following description.

This invention accordingly consists in the features of construction, combinations of elements and arrangements of parts which will be exemplified in the device hereinafter described and of which the scope of application will be indicated in the appended claims.

BRIEF DESCRIPTION OF THE DRAWINGS

In the drawings wherein like parts are identified by the same numerals.

DESCRIPTION OF THE PREFERRED EMBODIMENT

Figure 1:
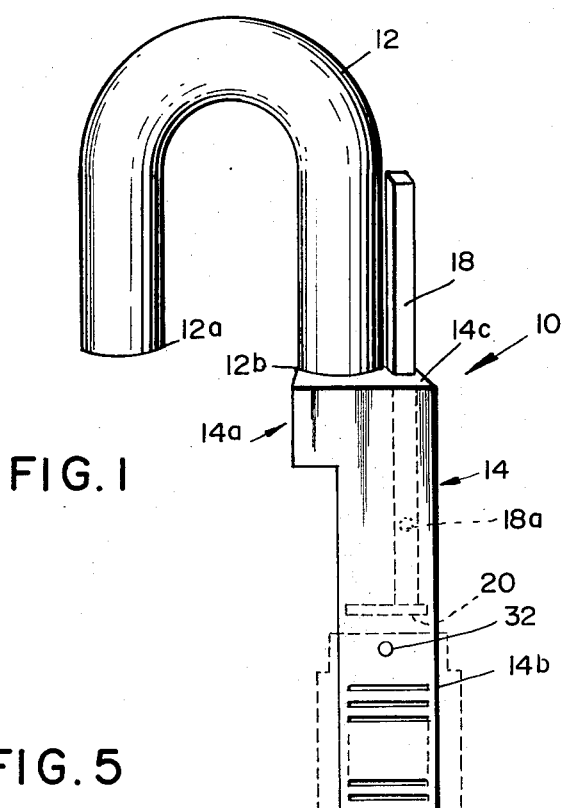
FIG. 1 is an exploded view of an embodiment of the present invention.

In FIG. 1 of the drawings a siphoning apparatus according to the present invention is shown. The siphoning apparatus includes a hollow U-shaped upper piece 12 and a lower piece 14. U-shaped piece 12 is preferably made of plastic, has a circular cross-section and ends 12a and 12b. End 12a is elevated above end 12b for a reason that will soon be apparent. Piece 14 is preferably made from a plastic material and is hollow. The upper shoulder portion 14a of piece 14 has a rectangular cross-section and is joined to end 12b of U-shaped piece 12. The lower portion of piece 14 has a substantially square cross-section, and includes a plurality of slots 14b on opposed sides thereof for a reason that will soon be apparent. Preferably, the slots are parallel to each other, perpendicular to the major axis of piece 14 and are on opposed parallel sides thereof.

Figure 4:
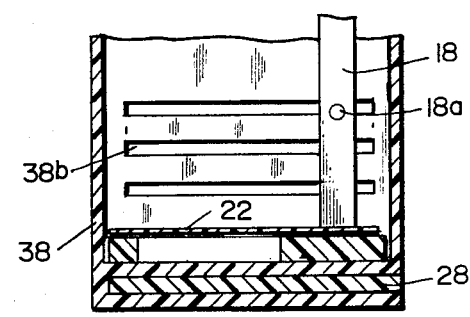
FIG. 4 is an enlarged sectional view showing the flapper and flapper support disc of the present invention.

A rod 18 slidably extends through surface 14c of shoulder portion 14a and has a stop 18a located thereon adjacent the bottom thereof. Preferably rod 18 is square in cross-section and the opening through which it projects is also square. Attached to the bottom of rod 18 is a square disc 20 which has an aperture 20a (FIG. 2) extending therethrough. Disc 20 is loosely slidable within the bottom portion of part 14 for a reason that will soon be apparent. Attached to rod 18 and located immediately above disc 20 is a flapper valve 22. Flapper valve 22 has approximately the same cross-section as disc 20 and is flexible so that when water is directed upwardly through aperture 20a it can flex to the position seen in FIG. 2. Conversely, water cannot flow downwardly through the aperture, since the water will press the flapper valve to the position seen in FIG. 4, preventing the water from going therethrough.

Figure 3:
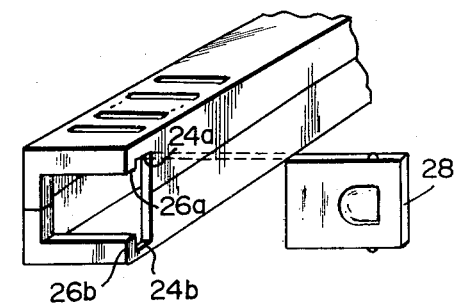
FIG. 3 is a partially exploded view of the bottom portion of the present invention.

The bottom of piece 14 is sealed and this can be conveniently done by having slots 24a and 24b (FIG. 3) located on opposite sides thereof adjacent to the bottommost portion. The slots are positioned directly above flanges 26a and 26b and a sealing piece 28 can be inserted in the slots and rested on the flanges to seal the bottom portion of part 14. Sockets may be located in slots 24a and 24b and sealing piece 28 can have pins so that the pins can fit in the sockets to securely hold sealing piece 28 in place. Of course if desired, glue or any other suitable securing means may be used.

In normal operation the siphoning apparatus is positioned with end 12a in the filter receptacle below the water level therein and the bottom of piece 14 within the aquarium tank.

Figure 2:
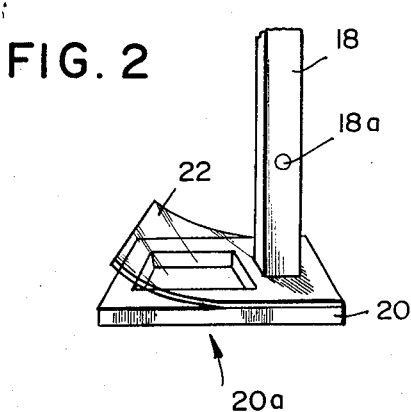
FIG. 2 is a perspective view of the flapper arrangement of the present invention.

In order to prime the siphoning apparatus, rod 18 is pushed downwardly and preferably so that disc 20 and flapper valve 22 are positioned beneath slots 14b. With the flapper valve in this position, water enters into the interior of piece 14 through slots 14b and the rod is then urged rapidly in an upward direction. The flapper valve sits on disc 20 and urges the water positioned thereabove through shoulder 14a into U-shaped upper piece 12. Stop 18a limits the upward movement of the flapper valve and disc and is positioned such that the flapper valve and disc are not moved into the upper shoulder portion 14a of piece 14. The rod is then moved rapidly downwardly and on the downward stroke the flapper valve is opened as can be seen in FIG. 2 due to the water within piece 14 flowing through aperture 20a.

After rod 18 has moved the flapper valve and its supporting disc 20 downwardly, the rod is again rapidly moved in an upward direction with the flapper valve closing and once more moving water into U-shaped piece 12. This cycle is repeated as required until the U-shaped piece is filled with water and sufficient water is in piece 14 so that siphoning operations may commence. When the siphoning operation is started, the rod may be lowered as far as possible.

End 12a of U-shaped piece 12 is above surface 14c of shoulder 14a and as a result thereof, the siphoning action will cease before surface 14c is above the water level. Consequently, there can be leakage through the aperture which receives rod 18 in surface 14c and the siphoning apparatus will still operate effectively. A pin 32 is located on one side of piece 14 above slots 14b.

Figure 5:
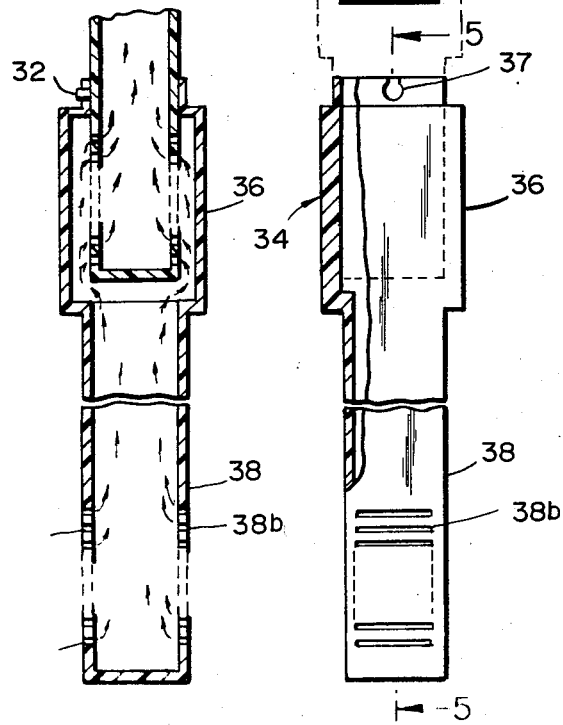
FIG. 5 is a sectional view taken substantially along the line 5—5 of FIG. 1.

An extension 34 includes an upper enlarged portion 36 which is continuous with a lower portion 38. Upper enlarged portion 36 has a substantially rectangular cross section and includes a pin opening 37 on one side thereof (FIG. 5). Located adjacent the bottom of lower portion 38 on opposite sides thereof are a plurality of slots 38b which are parallel to each other and perpendicular to the axis of extension 34.

In operation pin 32 is mated with pin opening 37 as can be seen in FIG. 5 and end 12a is placed below the water level in a filter receptacle while the bottom of extension 34 is placed beneath the water level in an aquarium tank. As can be seen in FIG. 5 enlarged portion 36 surrounds slots 14b and the water in the tank in which extension 34 is placed enters slots 38b so that the water within the extension is at the same level as the water in the tank.

Repeated movement of rod 18 and flapper valve 22 in upward and downward directions as previously described creates a reduced pressure within the bottom portion of piece 14 drawing water from the bottom of extension 34 upwardly through lower portion 38 into enlarged portion 36 and through slots 14b into piece 14. The continued movement of the rod as just described creates a continuous flow of water from the bottom of extension 38 through the extension and through pieces 14 and 12 such that the siphon and the extension are filled with water. When this happens siphoning can take place.

By use of extension 34 the siphoning apparatus of the present invention can be used with aquarium tanks having a substantial height. The reason for this is that while the tank may initially be filled with water and not require the extension, the passage of a certain amount of time without replenishing the supply of water in the tank brings the water line below the level of the bottom of piece 14 so that the siphoning action can no longer continue. By utilizing extension 34 even great drops in the water level in the tank will not prevent siphoning action. A particular advantage of this is that if a person decides to take a vacation for a few days he can fill his tank to its capacity and not worry that the siphoning action will stop due to the evaporation of water in the tank since by use of the extension the siphoning action will continue until the water level in the tank drops below the bottom of the extension.

It is to be appreciated that while the siphoning apparatus has been described in conjunction with aquariums that such apparatus can be used with other different environments as will be readily apparent to those skilled in the art.

Having thus described the invention, there is claimed as new and desired to be secured by Letters Patent:

1. A siphoning apparatus comprising a first part and a second part, each of said parts being hollow, said first part having first and second ends, water inlet means being located along the length of said first part adjacent said first end, said first part being of substantially constant cross sectional area going from said first end to a location adjacent said second end with the remaining cross section of said first part being of an increased cross sectional area, said second part having a reverse bend and two ends with one end connected to the uppermost portion of said first part, a rod projecting into said first part and having a disc secured to the lowermost portion thereof, said disc having an aperture passing therethrough, a flapper valve secured to said rod above said disc, and means for enabling said rod to be reciprocated within said first part but preventing said disc and flapper valve from being moved into the increased cross sectional area of said first part.

2. Siphoning apparatus according to claim 1 wherein the remaining end of said second part is at a higher elevation than the first end of said second part when the first and second parts are held vertically with the reverse bend positioned above said first part.

3. Siphoning apparatus according to claim 1 further including an extension means attached to said first part, said extension means surrounding said water inlet means in said first part and including means for communicating water to the interior of said first part.

4. Siphoning apparatus according to claim 3 wherein said extension means is defined by a hollow member having an upper and lower portion, said hollow member including water intake means at the bottommost portion thereof with the uppermost portion thereof in the immediate vicinity of said water inlet means of said first part.

5. A siphoning apparatus comprising a first part and a second part, each of said parts being hollow, said first part having first and second ends, water inlet means being located along the length of said first part adjacent said first end, said first part being of substantially constant cross sectional area going from said first end to a location adjacent said second end with the remaining cross section of said first end being of an increased cross sectional area, said second part having a reverse bend and two ends with one end connected to the uppermost portion of said first part, a rod projecting into said first part and having a one-way valve connected to the lowermost portion thereof, and means for enabling said rod to be reciprocated within said first part but preventing said one-way valve from being moved into the increased cross sectional area of said first part.

* * * * *